US006321194B1

(12) United States Patent
Berestesky

(10) Patent No.: US 6,321,194 B1
(45) Date of Patent: Nov. 20, 2001

(54) VOICE DETECTION IN AUDIO SIGNALS

(75) Inventor: Alexander Berestesky, Ashland, MA (US)

(73) Assignee: Brooktrout Technology, Inc., Needham, MA (US)

( * ) Notice: Subject to any disclaimer, the term of this patent is extended or adjusted under 35 U.S.C. 154(b) by 0 days.

(21) Appl. No.: 09/299,631

(22) Filed: Apr. 27, 1999

(51) Int. Cl.[7] .................................................... G10L 15/16

(52) U.S. Cl. ............................................ 704/232; 704/233

(58) Field of Search .................................... 704/246, 232, 704/233, 200, 248, 253, 265

(56) References Cited

U.S. PATENT DOCUMENTS

| | | |
|---|---|---|
| 4,356,348 | 10/1982 | Smith . |
| 4,405,833 | 9/1983 | Cave et al. . |
| 4,477,698 | 10/1984 | Szlam et al. . |
| 4,677,665 | 6/1987 | Walker . |
| 4,686,699 | 8/1987 | Wilkie . |
| 4,811,386 | 3/1989 | Sano et al. . |
| 4,918,734 | 4/1990 | Muramatsu et al. . |
| 4,979,214 | 12/1990 | Hamilton . |
| 5,263,019 | 11/1993 | Chu . |
| 5,305,307 | 4/1994 | Chu . |
| 5,319,703 | 6/1994 | Drory . |
| 5,371,787 | 12/1994 | Hamilton . |
| 5,404,400 | 4/1995 | Hamilton . |
| 5,450,484 | 9/1995 | Hamilton . |
| 5,638,436 | 6/1997 | Hamilton et al. . |
| 5,664,021 | 9/1997 | Chu et al. . |
| 5,715,319 | 2/1998 | Chu . |
| 5,778,082 | 7/1998 | Chu et al. . |
| 5,878,391 | 3/1999 | Aarts . |
| 6,102,935 * | 8/2000 | Harlan et al. ........................ 606/234 |
| 6,192,134 * | 2/2001 | White et al. .......................... 381/92 |

FOREIGN PATENT DOCUMENTS

| | | | |
|---|---|---|---|
| 404265163-A * | 9/1992 | (JP) | ................................ B03C/3/02 |
| WO-00655573 * | 11/2000 | (WO) | ............................. G10I/11/02 |

OTHER PUBLICATIONS

IEEE Journal on Selected Areas in Communications, vol. 16, No. 9. Beritelli et al., "A robust voice activity detector for wireless communication using soft computing". pp. 1818–1829. Dec. 1998.*

Cox, Earl, The Fuzzy Systems Handbook, AP Professional, 1994, Chapters 2 and 3, pp. 9–105.

Rabiner, Lawrence et al., Digital Processing of Speech Signals, Prentice–Hall, Inc. Englewood Cliffs, NJ, 1978, pp. 10–31 and 38–55.

* cited by examiner

*Primary Examiner*—Richemond Dorvil
(74) *Attorney, Agent, or Firm*—Fish & Richardson P.C.

(57) ABSTRACT

The presence of a voice in an audio signal is detected by sampling frequency components of the audio signal during a window that starts when a power of the audio signal reaches a predetermined threshold and stops when the audio signal's power drops below the predetermined threshold. An array of elements is generated based on the sampled frequency components. Each element in the array corresponds to a time-based sum of frequency components. Whether the audio signal corresponds to a voice is determined using one or values calculated from the generated array. The value may correspond either to a frequency-based sum of array elements or to the window. The calculated values are analyzed using fuzzy logic which generates a measure of a likelihood that the audio signal is a voice.

53 Claims, 6 Drawing Sheets

VOICE DETECTION IN AUDIO SIGNALS

BACKGROUND

This invention relates to identifying a presence of a voice in audio signals, for example, in a telephone network.

An audio signal can be any electronic transmission that conveys audio information. In a telephone network, audio signals include tones (for example, dual tone multifrequency (DTMF) tones, dial tones, or busy signals), noise, silence, or speech signals. Voice detection differentiates a speech signal from tones, noise, or silence.

One use for voice detection is in automated calling systems used for telemarketing. In the past, for example, a company trying to sell goods or services typically used several different telemarketing operators. Each operator would call a number and wait for an answer before taking further action such as speaking to the person on the line or hanging up and calling another prospective buyer. In recent years, however, telemarketing has become more efficient because telemarketers now use automatic calling machines that can call many numbers at a time and notify the telemarketer when someone has picked up the receiver and answered the call. To perform this function, the automatic calling machines must detect a presence of human speech on the receiver amid other audio signals before notifying the telemarketer. The detection of human speech in audio signals can be achieved using digital signal processing techniques.

FIG. 1 is a block diagram of a voice detector 10 that detects a presence of a voice in an audio signal. A time varying input signal 12 is received and a coder/decoder (CODEC) 14 may be used for analog-to-digital (A/D) conversion if the input signal is an analog signal; that is, a signal continuous in time. During A/D conversion, the CODEC 14 periodically samples in time the analog signal and outputs a digital signal 16 that includes a sequence of the discrete samples. The CODEC 14 optionally may perform other coding/decoding functions (for example, compression/decompression). If, however, the input signal 12 is digital, then no A/D conversion is needed and the CODEC 14 may be bypassed.

In either case, the digital signal 16 is provided to a digital signal processor (DSP) 18 which extracts information from the signal using frequency domain techniques such as Fourier analysis. Such frequency-domain representation of audio signals greatly facilitates analysis of the signal. A memory section 20 coupled to the DSP 18 is used by the DSP for storing and retrieving data and instructions while analyzing the digital audio signal 16.

FIG. 2A shows an example of a human speech audio signal 22 represented as an analog signal that may be input into the voice detector 10 of FIG. 1. Furthermore, FIG. 2B shows a digital signal 24 that corresponds to the input analog signal after it has been processed by the CODEC 14. In FIG. 2B, the analog signal of FIG. 2A has been sampled at a period Γ 26. Voiced sounds, such as those illustrated in region 28 of FIGS. 2A and 2B, generally result in a vibration of the human vocal tract and cause an oscillation in the audio signal. In contrast, unvoiced speech sounds, such as those illustrated in region 30 of FIGS. 2A and 2B, generally result in a broad, turbulent (that is, non-oscillatory), and low amplitude signal. The frequency domain representation of the human speech signal of FIG. 2B, for example, displays both voiced and unvoiced characteristics of human speech that may be used in the voice detector 10 to distinguish the speech signal from other audio signals such as tones, noise, or silence.

FIG. 3 is a flow chart of operation of the voice detector of FIG. 1. The voice detector 10 initially determines if the incoming audio signal 12 is digital in format (step 32). If the audio signal is digital, the voice detector 10 performs a discrete Fourier transform (DFT) analysis on the digitized signal (step 36). If, however, the audio signal is not digital, then the CODEC 14 samples the audio signal at a specified period to obtain a digital representation 16 of the audio signal (step 34). Then the voice detector 10 performs a DFT at step 36.

Parameters, such as frequency-domain maxima, are extracted from the signal (step 38) and are compared to predetermined thresholds (step 40). If the parameters exceed the thresholds, the voice detector 10 determines that the audio signal corresponds to a human voice, in which case the voice detector 10 reports the presence of the voice in the audio signal (step 42).

In step 38, the parameters extracted from the audio signal, such as the frequency-domain maxima, may, for example, correspond to formant frequencies in speech signals. Formants are natural frequencies or resonances of the human vocal tract that occur because of the tubular shape of the tract. There are three main resonances (formants) of significance in human speech, the locations of which are identified by the voice detector 10 and used in the voice detection analysis. Other parameters may be extracted and used by the voice detector 10.

Voice detection analysis is complicated by the fact that formant frequencies are sometimes difficult to identify for low-level voiced sounds. Moreover, defining the formants for unvoiced regions (for example, region 30 in FIGS. 2A and 2B) is impossible.

SUMMARY

Implementations of the invention may include various combinations of the following features.

In one general aspect, a method of detecting a presence of a voice in an audio signal comprises sampling frequency components of the audio signal during a window that starts when a power of the audio signal reaches a predetermined threshold and stops when the audio signal's power drops below the predetermined threshold. The method further comprises generating an array of elements based on the sampled frequency components, each element of the array corresponding to a time-based sum of frequency components. The method makes a voice detection determination based on one or more values calculated from the generated array. Each value corresponds either to a frequency-based sum of array elements or to the window.

Embodiments may include one or more of the following features.

A value corresponding to a frequency-based sum of array elements may be a ratio of a frequency-based sum of array elements in a lower frequency range and a frequency-based sum of array elements in a higher frequency range. A value corresponding to a frequency-based sum of array elements may be a ration of a maximum-value array element in a lower frequency range and a frequency-based sum of array elements in the lower frequency range other than the maximum-value element.

Prior to sampling, the power of the audio signal may be estimated.

The determining may comprise analyzing the calculated values using fuzzy logic, in which analyzing comprises generating a degree of membership in a fuzzy set for each value. The degree of membership, which may be based on a statistical analysis of audio signals, may represent a measure of a likelihood that the audio signal is a voice. The analyzing may comprise combining degrees of membership for each value into a final value and converting the final value into a voice detection decision. The final value may be converted into a decision by comparing the final value to a predetermined threshold.

The audio signals may occur on a telephone line. Likewise, the audio signals may occur in a computer telephony line.

The methods, techniques, and systems described here may provide one or more of the following advantages. The voice detector is implemented using digital signal processing (DSP) and fuzzy analysis techniques to determine the presence of a voice in an audio signal. The voice detector provides higher reliability and greater simplicity since features are extracted from the averaged spectrum of the incoming signal and fuzzy (as opposed to boolean) logic is employed in the voice detection decision. Furthermore, the voice detector is adaptable since fuzzy logic parameters may be adjusted for different telephone calling locations or lines. This adaptability, in turn, contributes to higher voice detection reliability.

Other advantages and features will become apparent from the detailed description, drawings, and claims.

DRAWING DESCRIPTIONS

DETAILED DESCRIPTION

Certain applications in telecommunications require reliable detection of speech sounds amid tones such as call-progression tones or dual tone multifrequency (DTMF) tones, noise, and silence. In general, voice detectors that recognize speech based on frequency-domain maxima are relatively unreliable because only a few frequency-domain maxima are used and complete spectrum information of a "word" is ignored. (A "word" is any audio signal with energy, that is, an amplitude of the frequency spectrum, large enough to trigger voice detection analysis.) In contrast, a voice detector that utilizes several average values from a substantially complete frequency-domain audio spectrum and fuzzy logic techniques provides simpler implementation, greater flexibility, and higher reliability.

Figure 1:
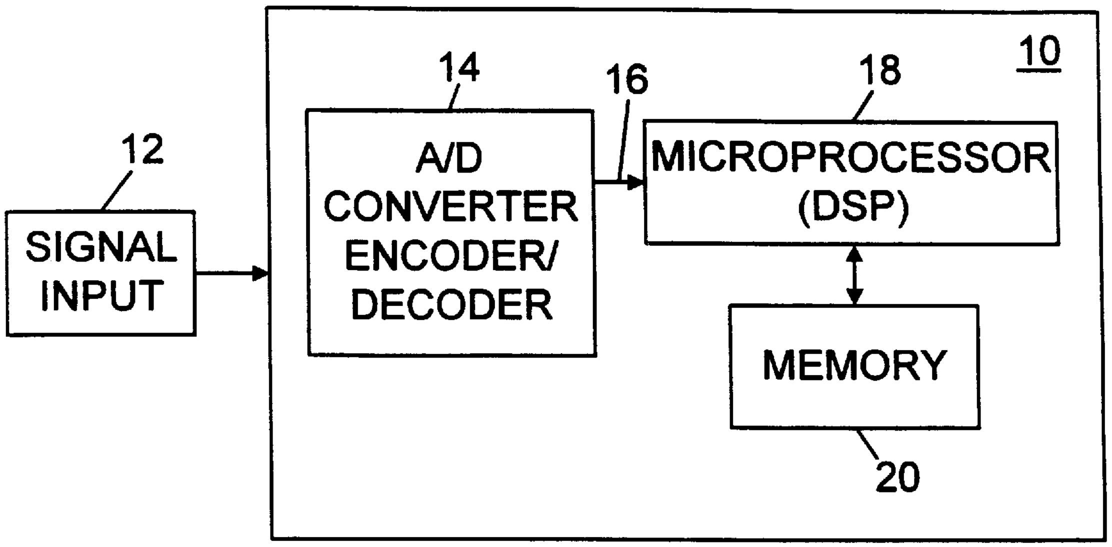
FIG. 1 is a block diagram of a detector that can be used for detection of a voice.
Figure 2A:
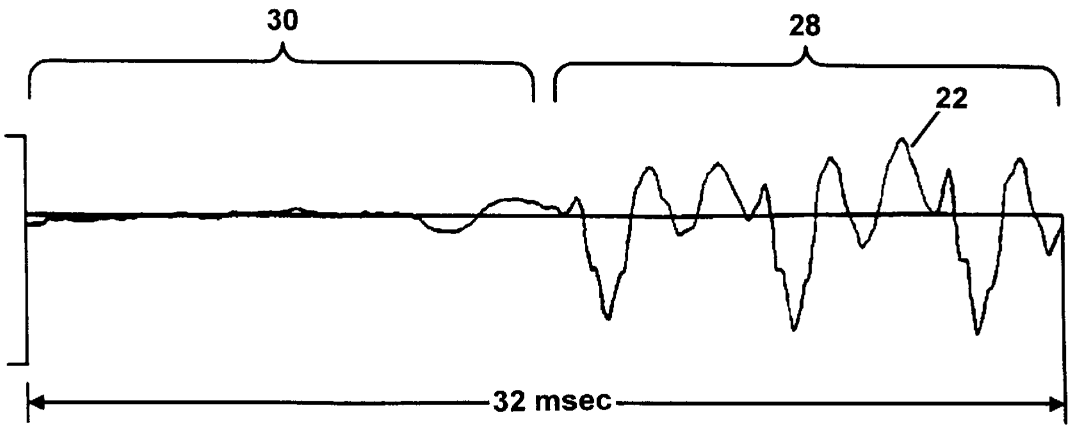
FIGS. 2A and 2B are graphs of a speech signal represented, respectively, as an analog signal and as a sequence of samples.
Figure 2B:
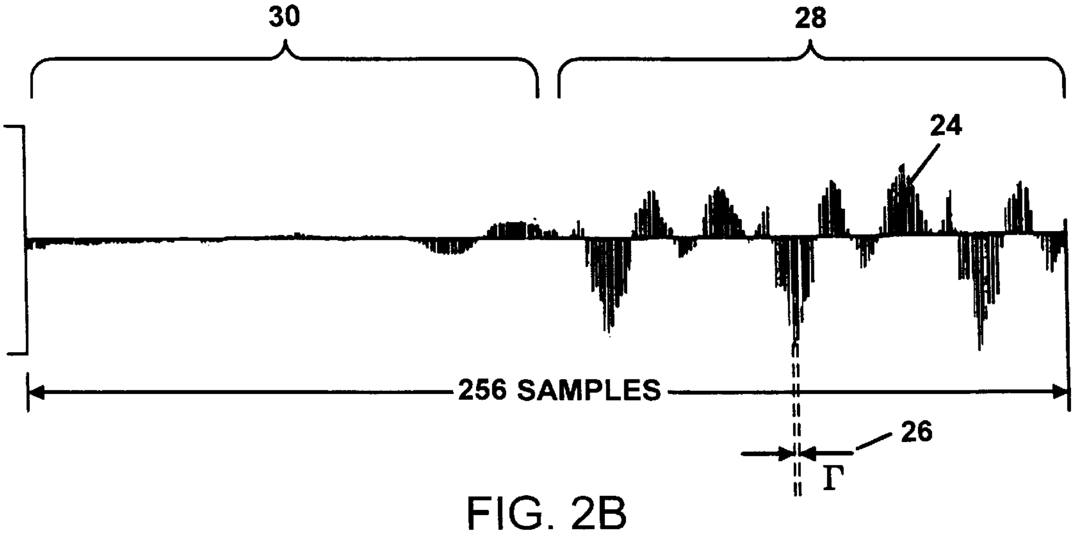
Figure 3:
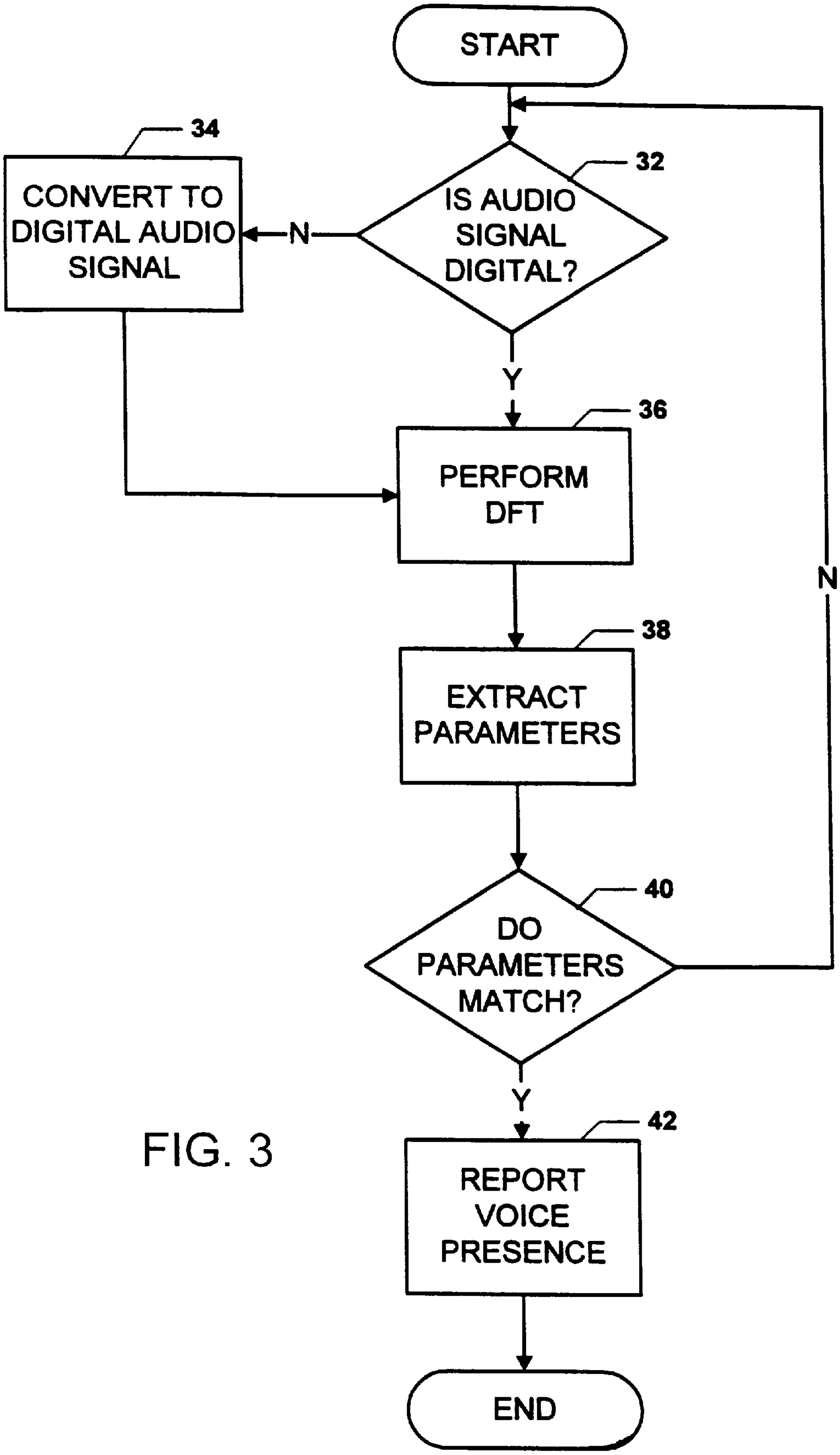
FIG. 3 is a flowchart of voice detection of FIG. 1 that uses frequency-domain parameter extraction.
Figure 4:
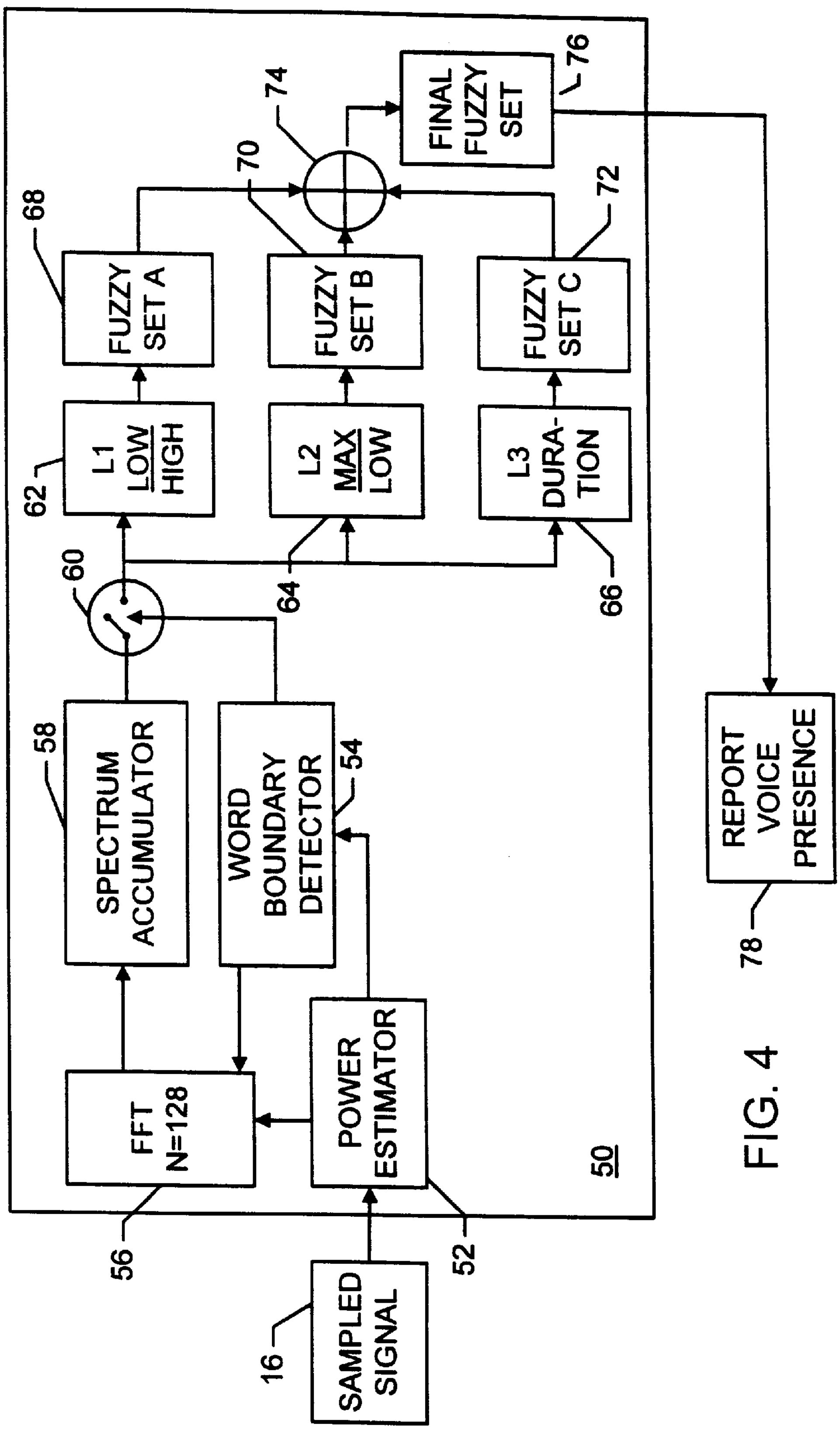
FIG. 4 is a block diagram showing elements of a voice detection analysis technique based on several averaged frequency-domain features.

FIG. 4 shows a block diagram of such a voice detector 50 that uses several frequency-domain averaged features and further employs fuzzy logic for making the voice detection decision. A digital audio signal x(n) (block 16) serves as an input for the voice detector 50, where n is an index of time. Periodically, a power estimator 52 estimates the power of the incoming signal sample x(n). Power estimation may occur every 10 ms, a length of time much shorter than the duration of a spoken word in human speech. A word boundary detector 54 compares the power of the incoming signal 16 to a predetermined word threshold (WORD_THRESHOLD). If the audio signal's power exceeds WORD_THRESHOLD, then the digital signal 16 is provided to a block 56 which performs a fast Fourier transform (FFT) on the incoming samples x(n). Output of the block 56 at time t and at frequency $\omega_i$ is a frequency-domain representation $Y_t(\omega_i)$ of the incoming audio signal x(n), where $\omega_i$ is $(2\pi/\Gamma)i$, i is a frequency index and $\Gamma$ is a length of a fetch which is used to compute the FFT. $Y_t(\omega_i)$ is provided to a spectrum accumulator 58. The spectrum accumulator 58 sums corresponding spectral components for a time window T:

$$Y_s(\omega_i) = \sum_T |Y_t(\omega_i)| \tag{1}$$

where $|Y_t(\omega_i)|$ is an absolute value of the output of the FFT at a time t for a frequency $\omega_i=(2\pi/\Gamma)i \in [250, 2500]$ Hz. This frequency range is selected because it encompasses most of the energy of the speech signal. The time window starts when the power of the audio signal reaches WORD_THRESHOLD and stops when the audio signal's power drops below the WORD_THRESHOLD. Therefore, spectrum accumulator 58 averages over a complete duration of the "word" defined by the window which, for example, may correspond to a word such as "hello" or a DTMF tone. A switch 60 closes when the accumulation stops—that is, when the power drops below WORD_THRESHOLD. Accumulation at block 58 is a sum over time; thus output $Y_S$ of the accumulator block 58 is an array independent of time and indexed in frequency by i:

$$Y_s = \begin{pmatrix} Y_s(\omega_1) \\ Y_s(\omega_2) \\ Y_s(\omega_3) \\ \vdots \\ Y_s(\omega_{max}) \end{pmatrix} \tag{2}$$

where max is a maximum frequency index.

When the switch 60 closes, output of spectrum 5 accumulator 58 is provided to feature extraction blocks 62, 64, 66 which calculate values based on elements in the array $Y_s$. A first block 62 calculates feature L1; a ratio of a sum of lower-frequency spectrum components to a sum of higher-frequency spectrum components in Eqn. 2:

$$L1 = \frac{\sum_{\omega_i \in [250,680]\,Hz} Y_s(\omega_i)}{\sum_{\omega_j \in [750,2500]\,Hz} Y_s(\omega_j)} \tag{3}$$

If the audio signal has a frequency spectrum that spans the range [250, 2500] Hz of frequencies, then L1 would be on the order of 1.

A second block 64 calculates feature L2, a ratio of a maximum value (MAX) of the lower-frequency elements in the 15 array to a sum of all other lower-frequency elements in the array:

$$L2 = \frac{\text{MAX}[250, 680]\,\text{Hz}}{\sum_{\omega_i \in [250,680]\,\text{Hz}} Y_s(\omega_i) - \text{MAX}[250, 680]\,\text{Hz}} \quad (4)$$

L2 is a measure of a lower-frequency spectrum shape in the audio signal. For example, if the audio signal were a tone with a single frequency component of 480 Hz, then L2 would be relatively large since the maximum value (MAX) would be the value of $Y_s$ at a frequency of 480 Hz and all other frequency components would be much smaller than the maximum value. If, on the other hand, the audio signal corresponded to noise, then L2 would be relatively small since the maximum value (MAX) is about the same size as all other frequency components in that range.

A third block 66 calculates feature L3, a duration T of the word:

$$L3=T \quad (5)$$

L3 is a measure of the length of the word.

Figure 5:
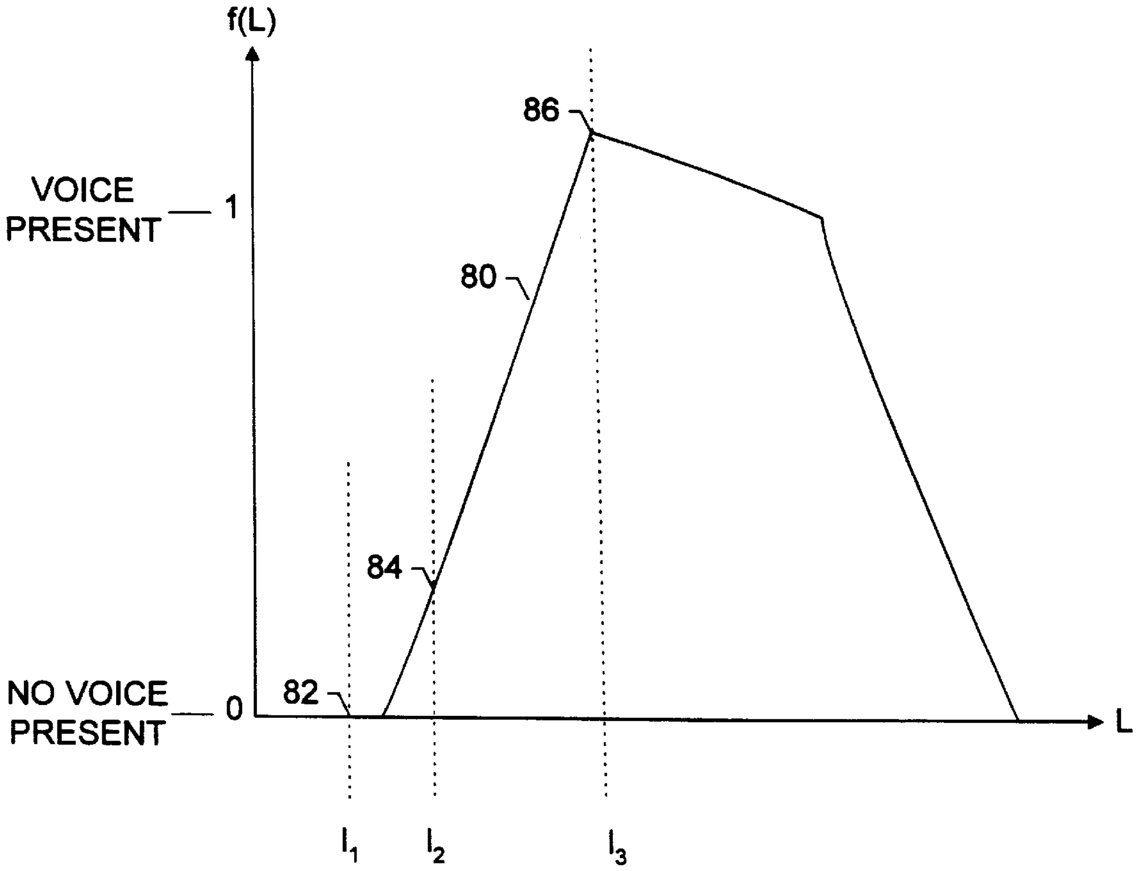
FIG. 5 is a graph of a generalized fuzzy membership function.

L1, L2, and L3 are used as input values for corresponding fuzzy set blocks A 68, B 70, and C 72. Each fuzzy set block output $f_i$ (L), where $i \in [A,B,C]$ and $L \in [L1,L2,L3]$, represents a degree of membership in the fuzzy set for a particular value of the input feature L. The degree of membership $f_i(L)$ is a value (ranging from 0 to 1) of a membership function $f_i$ at point L. Degree of membership $f_i(L)$ shows how much the value of the feature (L) is compatible with the proposition that the input signal 16 represents human speech. FIG. 5 shows an example of a generalized membership function f 80 as a function of the feature L given in arbitrary units. For a value of L equal to $l_1$ (at point 82), the fuzzy set outputs a value of 0.0 which indicates that the input signal 16 does not represent human speech. Similarly, for L equal to $l_2$ (at point 84), the fuzzy set outputs a value of 0.16 which indicates that the input signal 16 almost assuredly does not represent human speech. In contrast, for L equal to $l_3$ (at point 86), the fuzzy set outputs a value of 1.0 which indicates that the input signal 16 represents human speech.

Before operation of the voice detector 50, the membership functions $f_i(L)$ are determined from a statistical analysis of typical audio signals that occur on telephone lines. For example, to determine the membership function $f_c(L)$, audio signal word lengths are measured repeatedly to build a statistical histogram of lengths which serves as the basis for the membership function $f_c(L)$. A shape of the membership function may be changed depending on a calling location or telephone line since tones used in telephone signals and speech patterns vary widely throughout the world.

Referring again to FIG. 4, the degrees of membership $f_A(L1)$, $f_B(L2)$, and $f_c(L3)$ are combined at junction 74 using a fuzzy additive technique. For example, the fuzzy additive technique may calculate an average F(A,B,C) of the individual degrees of membership:

$$F(A, B, C) = \frac{f_A(L1) + f_B(L2) + f_C(L3)}{3} \quad (6)$$

Using Eqn. 6, if $f_A(L1)=0.93$, $f_B(L2)=0.99$, and $f_c(L3)=0.87$, then F(A,B,C)=0.93. Furthermore, junction 74 may be configured to take a weighted average $F(W_A A, W_B B, W_C C)$ if certain features L are more important to voice detection than others.

Output F(A,B,C) of junction 74 represents a final fuzzy set 76 and is used for defuzzification. Defuzzification converts the final fuzzy set 76 into a classical boolean set—that is, {0,1}. The value of F, which ranges from 0 to 1, is compared to a predetermined defuzzification threshold D. If F is less than or equal to D then defuzzification converts F to a 0. If F is greater than D, then defuzzification converts F to a 1. The voice detector 50 generates a report 78 of the value F. A value of 1 indicates a presence of a voice in the audio signal and a value of 0 indicates voice rejection. For example, if D is set to 0.97, and F is 0.93 (as above), then D is 0 and no voice is detected. The value of D may be adjusted depending on calling location, telephone line, or membership functions.

Figure 6:
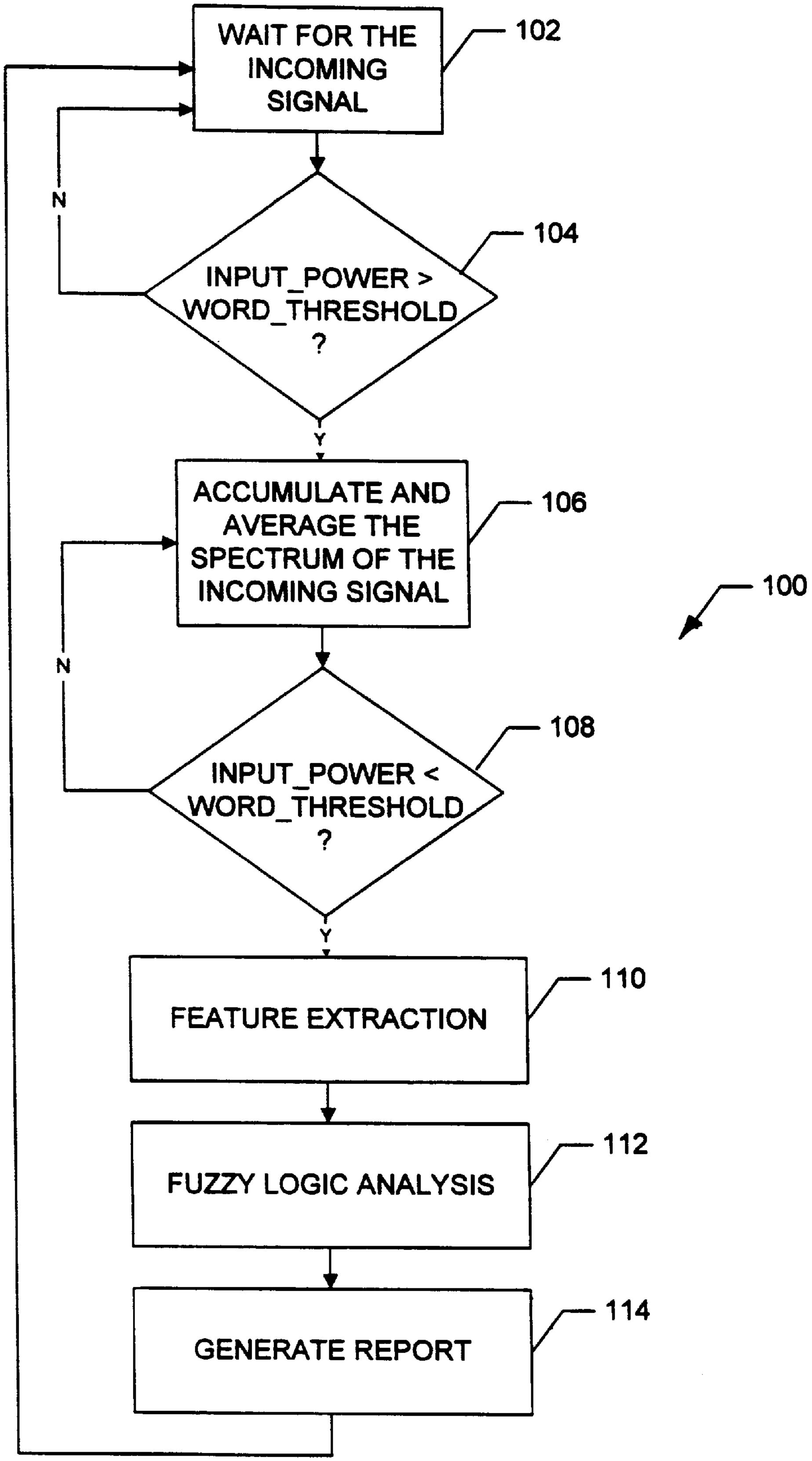
FIG. 6 is a flowchart illustrating the voice detection of FIG. 4.

FIG. 6 shows a flowchart for a voice detection procedure 100 of FIG. 4. The voice detector 50 waits for the incoming sampled signal 16 (step 102). Then, the word boundary detector 54 determines if the power of the signal is greater than the WORD-THRESHOLD (step 104). If the power is not greater than the WORD-THRESHOLD, then the procedure advances to step 102 where the voice detector 50 waits for the sampled signal 16.

If, at step 104, the power is greater than the WORD-THRESHOLD, then the spectrum accumulator 58 accumulates frequency spectrum components (output by block 56) of the incoming signal 16 (step 106). At step 108, the word boundary detector 54 determines if the power of the signal 16 is less than WORD-THRESHOLD. If the power remains above WORD-THRESHOLD, the procedure advances to step 104 where the spectrum accumulator 58 accumulates frequency spectrum components. If, at step 108, the power falls below WORD-THRESHOLD, then the switch 60 closes and blocks 62, 64, 66 extract features L1, L2, and L3, respectively (step 110). The procedure 100 advances to step 112 where fuzzy set blocks A 68, B 70, and C 72 and junction 74 perform fuzzy logic analysis to determine if the signal corresponds to a voice. The voice detector 50 generates a report based on the output of junction 74 (step 114).

The systems and techniques described here may be used in any DSP application in which detection of a voice in an audio signal is desired—for example, in any telephony or computer telephony application. In computer telephony applications, detection of a voice in an audio signal requires a statistical analysis that includes computer audio signals in addition to traditional telephone audio signals.

These systems and techniques may be implemented in digital electronic circuitry, or in computer hardware, firmware, software, or in various combinations thereof. Apparatus embodying these techniques may include appropriate input and output devices, a computer processor, and a computer program product tangibly embodied in a machine-readable storage device for execution by a programmable processor.

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Other embodiments are within the scope of the following claims.

What is claimed is:

1. A method of detecting a presence of a voice in an audio signal, the method comprising:

sampling frequency components of the audio signal during a window that starts when a power of the audio signal reaches a predetermined threshold and stops when the audio signal's power drops below the predetermined threshold;

generating an array of elements based on the sampled frequency components, each element of the array corresponding to a time-based sum of frequency components; and determining whether the audio signal corresponds to a voice based on one or more values calculated from the generated array, each value corresponding either to a frequency-based sum of array elements or to the window.

2. The method of claim 1, in which a value corresponding to a frequency-based sum of array elements is a ratio of a frequency-based sum of array elements in a lower frequency range and a frequency-based sum of array elements in a higher frequency range.

3. The method of claim 1, in which a value corresponding to a frequency-based sum of array elements is a ratio of a maximum-value array element in a lower frequency range and a frequency-based sum of array elements in the lower frequency range other than the maximum-value element.

4. The method of claim 1, further comprising, prior to sampling, estimating the power of the audio signal.

5. The method of claim 1, in which determining comprises analyzing the calculated values using fuzzy logic.

6. The method of claim 5, in which analyzing comprises generating a degree of membership in a fuzzy set for each value.

7. The method of claim 6, in which the degree of membership represents a measure of a likelihood that the audio signal is a voice.

8. The method of claim 7, in which the degree of membership is based on a statistical analysis of audio signals.

9. The method of claim 7, in which analyzing comprises combining the degrees of membership for each value into a final value and converting the final value into a voice detection decision.

10. The method of claim 9, in which converting the final value comprises comparing the final value to a predetermined threshold.

11. The method of claim 1, in which the audio signal occurs on a telephone line.

12. The method of claim 1, in which the audio signal occurs in a computer telephony line.

13. A method of detecting a presence of a voice in an audio signal, the method comprising:

generating an array of elements in which each element of the array corresponds to a time-based sum of frequency components of the audio signal;

calculating one or more values from the generated array; and analyzing the calculated values using fuzzy logic to determine whether a voice is present in the audio signal;

in which at least one of the one or more values is a window of time that starts when a power of the audio signal reaches a predetermined threshold and stops when the audio signal's power drops below the predetermined threshold.

14. The method of claim 13, in which analyzing comprises generating a degree of membership in a fuzzy set for each value.

15. The method of claim 14, in which the degree of membership represents a measure of a likelihood that the audio signal is a voice.

16. The method of claim 15, in which the degree of membership is based on a statistical analysis of audio signals.

17. The method of claim 15, in which analyzing comprises combining the degrees of membership for each value into a final value and converting the final value into a voice detection decision.

18. The method of claim 17, in which converting the final value comprises comparing the final value to a predetermined threshold.

19. The method of claim 13, in which the audio signal occurs on a telephone line.

20. The method of claim 13, in which the audio signal occurs on a computer telephony line.

21. A method of detecting a presence of a voice in an audio signal, the method comprising:

generating an array of elements in which each element of the array corresponds to a time-based sum of frequency components of the audio signal;

calculating one or more values from the generated array; and analyzing the calculated values using fuzzy logic to determine whether a voice is present in the audio signal;

in which at least one of the one or more values is a ratio of a frequency-based sum of array elements in a lower frequency range and a frequency-based sum of array elements in a higher frequency range.

22. The method of claim 21, in which analyzing comprises generating a degree of membership in a fuzzy set for each value.

23. The method of claim 22, in which the degree of membership represents a measure of a likelihood that the audio signal is a voice.

24. The method of claim 23, in which the degree of membership is based on a statistical analysis of audio signals.

25. The method of claim 23, in which analyzing comprises combining the degrees of membership for each value into a final value and converting the final value into a voice detection decision.

26. The method of claim 25, in which converting the final value comprises comparing the final value to a predetermined threshold.

27. The method of claim 21, in which the audio signal occurs on a telephone line.

28. The method of claim 21, in which the audio signal occurs on a computer telephony line.

29. A method of detecting a presence of a voice in an audio signal, the method comprising:

generating an array of elements in which each element of the array corresponds to a time-based sum of frequency components of the audio signal;

calculating one or more values from the generated array; and analyzing the calculated values using fuzzy logic to determine whether a voice is present in the audio signal;

in which at least one of the one or more values is a ratio of a maximum-value array element in the lower frequency range and a frequency-based sum of array elements in the lower frequency range other than the maximum-value element.

30. The method of claim 29, in which analyzing comprises generating a degree of membership in a fuzzy set for each value.

31. The method of claim 30, in which the degree of membership represents a measure of a likelihood that the audio signal is a voice.

32. The method of claim 31, in which the degree of membership is based on a statistical analysis of audio signals.

33. The method of claim 31, in which analyzing comprises combining the degrees of membership for each value into a final value and converting the final value into a voice detection decision.

34. The method of claim 33, in which converting the final value comprises comparing the final value to a predetermined threshold.

35. The method of claim 29, in which the audio signal occurs on a telephone line.

36. The method of claim 29, in which the audio signal occurs on a computer telephony line.

37. A method of detecting a presence of a voice on an audio signal, the method comprising:

generating an array of elements in which each element of the array corresponds to a time-based sum of frequency components of the audio signal;

calculating two or more values from the generated array including a first value corresponding to a ratio of a frequency-based sum of array elements in a lower frequency range and a frequency-based sum of array elements in a higher frequency range, and second value corresponding to a ratio of a maximum-value array element in the lower frequency range and a frequency-based sum of array elements in the lower frequency range other than the maximum-value element; and analyzing the calculated values to determine whether a voice is present in the audio signal.

38. The method of claim 37, in which a third value is a time window that starts when a power of the audio signal reaches a predetermined threshold and stops when the audio signal's power drops below the predetermined threshold.

39. The method of claim 37, in which analyzing comprises using fuzzy logic to determine a measure of a likelihood that the audio signal is a voice.

40. The method of claim 39, in which analyzing comprises a statistical analysis of audio signals.

41. A method of detecting a presence of a voice on an audio signal, the method comprising:

sampling frequency components of the audio signal during a window that starts when a power of the audio signal reaches a predetermined threshold and stops when the audio signal's power drops below the predetermined threshold;

generating an array of elements based on the sampled frequency components, each element of the array corresponding to a time-based sum of frequency components;

calculating two or more values from the generated array including a first value corresponding to a ratio of a frequency-based sum of array elements in a lower frequency range and a frequency-based sum of array elements in a higher frequency range, and another value corresponding to a ratio of a maximum-value array element in the lower frequency range and a frequency-based sum of array elements in the lower frequency range other than the maximum-value element; and analyzing the calculated values and the window using fuzzy logic to determine whether a voice is present in the audio signal.

42. The method of claim 41, in which determining comprises analyzing the calculated values using fuzzy logic.

43. The method of claim 42, in which analyzing comprises generating a degree of membership in a fuzzy set for each value.

44. The method of claim 43, in which the degree of membership represents a measure of a likelihood that the audio signal is a voice.

45. The method of claim 44, in which the degree of membership is based on a statistical analysis of audio signals.

46. The method of claim 44, in which analyzing comprises combining the degrees of membership for each value into a final value and converting the final value into a voice detection decision.

47. The method of claim 46, in which converting the final value comprises comparing the final value to a predetermined threshold.

48. The method of claim 41, in which the audio signal occurs on a telephone line.

49. The method of claim 41, in which the audio signal occurs on a computer telephony line.

50. A voice detector which detects a presence of a voice in an audio signal, the detector comprising:

a word boundary detector that defines a window that starts when a power of the audio signal reaches a predetermined threshold and stops when the audio signal's power drops below the predetermined threshold;

a frequency transform that transforms, during the window, the audio signal into a sequence of frequency components in discrete time intervals;

a spectrum accumulator that calculates, during the window, a time-based sum of frequency components for each discrete frequency interval;

a parameter extractor that calculates one or more values, each value corresponding either to a frequency-based sum of an output of the spectrum accumulator or to the window; and a decision element that determines whether the audio signal corresponds to a voice based on output of the parameter extractor.

51. The voice detector of claim 50, in which the decision element comprises, for each extracted value, a fuzzy set block that determines a measure of a likelihood that the audio signal is a voice.

52. The voice detector of claim 51, in which the decision element comprises a junction that combines the outputs of the fuzzy set blocks and compares this combination to a predetermined threshold.

53. Computer software, stored on a computer-readable medium, for a voice detection system, the software comprising instructions for causing a computer system to perform the following operations:

sample frequency components of the audio signal during a window that starts when a power of the audio signal reaches a predetermined threshold and stops when the audio signal's power drops below the predetermined threshold;

generate an array of elements based on the sampled frequency components, each element of the array corresponding to a time-based sum of frequency components; and determine whether the audio signal corresponds to a voice based on one or more values calculated from the generated array, each value corresponding either to a frequency-based sum of array elements or to the window.

* * * * *